M. W. Griswold,
Lock Nut.
No. 95,897.   Patented Oct. 19, 1869.
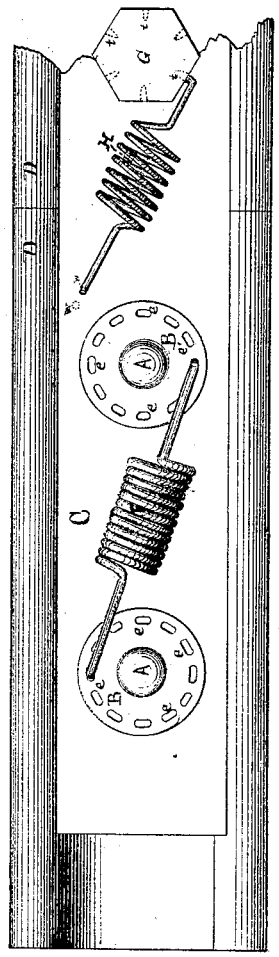
Witnesses
C. H. Rome
H. S. Miller
Inventor
Merritt W. Griswold
By David A. Burr

United States Patent Office.

MERRITT W. GRISWOLD, OF NEW YORK, N. Y.

Letters Patent No. 95,897, dated October 19, 1869.

IMPROVEMENT IN LOCK-NUT.

The Schedule referred to in these Letters Patent and making part of the same.

*To all whom it may concern:*

Be it known that I, MERRITT W. GRISWOLD, of the city, county, and State of New York, have invented a new and improved Spring-Clamp and Lock for Nuts and Screw-Bolts; and I do hereby declare the following to be a full and exact description thereof, reference being had to the accompanying drawings, forming a part of this specification.

The nature of my invention consists in the novel combination of straight spiral tension-springs, either with screw-nuts on fixed bolts, or directly with the heads or ends of free screw-bolts or screws, which are subjected to vibrations, as, for instance, in railroad-cars, or at the joints of railway-rails, so that the vibration of the bolts, instead of loosening the nuts or bolts, will operate to tighten the same, and keep them up close to their work.

In the accompanying drawings—

A A represent bolts, which are fixed so as not to turn, and are secured by nuts B B, screwing on to the ends thereof.

C, a "fish-plate," uniting the ends of two railway-rails D D.

The nuts B B are represented as circular, but may, of course, be angular in form.

Holes, e e e', are drilled in the edges thereof, to receive the ends of an extended spiral spring, F, so placed as to exert a constant strain upon each of the nuts, tending to turn them in the direction which tightens the same.

In cases where there are not two bolts in proximity as herein illustrated, the end of the spring removed from the nut may be firmly secured in any suitable manner to the plate or other body through which the bolt passes, as is shown in the spring H of the drawing. This spring H is illustrated as applied to the head of a bolt, G, which, instead of being fixed so as not to revolve, and secured by a free nut, as in the case of the bolts B, is itself free, and screws into a fixed nut or a threaded aperture in the opposite plate of the joint.

One end of the spring H hooks into one of the holes, *t*, drilled into the perimeter of the bolt-head, or may be otherwise secured to the edge thereof, and the other may hook into a hole, *w*, drilled in the plate C to receive it, or be fastened to a pin projecting from the plate. The tension exerted by this spring upon the bolt G, tending to turn it in the direction which tightens it, will, as in the case of the spring F and nuts B, serve to keep the bolt constantly and firmly in place.

In some instances, it may be found preferable to attach the spring to the screw-end of a screw-bolt, G, instead of to the head thereof. This may be done by using a pin, passing through an aperture pierced in the end of the bolt, at right angles to its length, as a lever, to which to fasten the end of the spring.

Whenever, by the shrinkage or wear of the materials through which the bolts pass, the nuts B or free bolts G have turned so far as to relieve their springs from tension, it is only necessary to disengage the spring from the hole in the nut or bolt-head, in which it has been secured, and extend it to another, as, for instance, from holes e of nuts B, in the drawing, to e'.

This combination of an extended spiral spring with screw-nuts B or screw-bolts G serves not only to lock the nut or bolt, so that no amount of jar or concussion can loosen it, but will operate to tighten it as the iron or wood through which the bolt passes shrinks or wears away, thereby keeping it always tight and close up to its work, and preventing the wear incident to the friction of a loose bolt.

I contemplate the application of my spring-clamp and lock, as described, to any and all forms of free screw-nuts upon fixed bolts, or of free bolts screwing into fixed nuts or plates, wherever the same are employed.

I do not claim broadly the use of a spring for tightening and securing nuts or bolts.

My invention relates to the peculiar adaptation and combination, as herein set forth, of a spiral spring to this end, whereby I obtain not only all the advantages incident to a better and more secure fastening, at a less cost than by any other plan, but also the advantages attendant upon the combination of a single spring with two nuts or two bolts, as herein illustrated and described.

Having thus fully described my invention,

I claim therein as new, and desire to secure by Letters Patent—

A spiral spring, F, or H, combined with the edges or periphery of either end of a free screw-bolt, or of a free screw-nut upon a fixed bolt, to lock and tighten the same, substantially as herein set forth.

Also, an interposed spring, when extended between and secured to the edges or peripheries of two or more nuts B B, or of two or more free bolts G, passing into fixed or secured nuts or threaded apertures, so as to lock and tighten the same, substantially as herein set forth.

The foregoing specification of my improved spring nut-clamp, signed by me, this 19th day of April, 1869.

MERRITT W. GRISWOLD.

Witnesses:
E. T. COVELL,
GEORGE R. DOTIN.